United States Patent [19]
Robison

[11] Patent Number: 5,148,844
[45] Date of Patent: Sep. 22, 1992

[54] FLAIL DRUM SYSTEM

[75] Inventor: Milan W. Robison, Weidman, Mich.

[73] Assignee: Chiparvestors, Inc., Winn, Mich.

[21] Appl. No.: 834,597

[22] Filed: Feb. 12, 1992

[51] Int. Cl.⁵ .............................................. B27L 1/00
[52] U.S. Cl. .............................. 144/208 J; 144/2 Z;
144/341; 144/343; 144/337; 144/3 R;
241/101.7; 241/193
[58] Field of Search ...................... 241/101.7, 193;
144/2 Z, 208 R, 208 J, 337, 370, 3 R, 341, 343

[56] References Cited

U.S. PATENT DOCUMENTS

| | | |
|---|---|---|
| 1,552,498 | 9/1925 | Noyes . |
| 2,792,860 | 5/1957 | Watkins .......................... 144/208 J |
| 4,023,604 | 5/1977 | Stadnick . |
| 4,061,166 | 12/1977 | Larson . |
| 4,172,481 | 10/1979 | Brisson ............................... 144/2 Z |
| 4,222,418 | 9/1980 | McCray et al. . |
| 4,572,258 | 2/1986 | Mischel ............................ 144/208 J |
| 4,690,187 | 9/1987 | Schmidt . |
| 4,711,280 | 12/1987 | Schmidt . |
| 4,719,950 | 1/1988 | Peterson et al. . |
| 4,787,431 | 11/1988 | Demlow ........................... 144/208 J |
| 4,889,169 | 12/1989 | Peterson et al. ................. 144/208 J |
| 4,947,906 | 8/1990 | Schroeder ......................... 144/2 X |

*Primary Examiner*—W. Donald Bray
*Attorney, Agent, or Firm*—Learman & McCulloch

[57] ABSTRACT

A flail drum system for delimbing and/or debarking small trees and logs has an upper rotary chain flail drum disposed above the path of travel of the wood product and a lower rotary chain flail drum disposed below the path of the product adjacent to the upper drum. Both drums rotate about a generally horizontal axis transverse to the path of travel of the tree or log. Each flail drum assembly includes a central drive shaft and axially spaced apart end rod support members releasably fixed to the shaft. A series of rod support rings have circumferentially spaced openings through which the rods releasably extend to be also releasably received by the end support members. Circumferentially scalloped spacers between the rings, and between the endmost rings and end members, provide radially inwardly extending openings through which the rods pass. Radially extending chains, having inner terminal links which are received on the rods, are provided in the scalloped openings of the spacers and, as the shaft rotates, the chain flails radially contact the wood product moving in the flailing path.

18 Claims, 5 Drawing Sheets

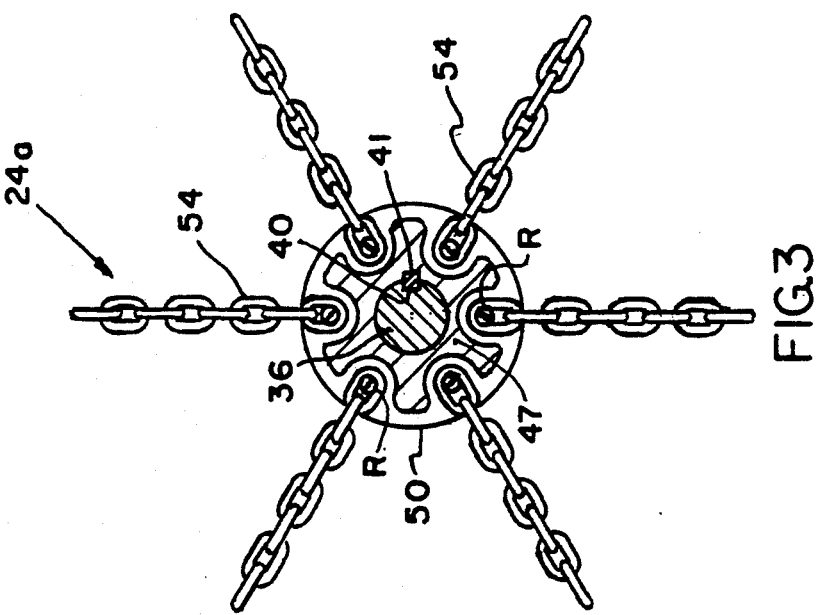
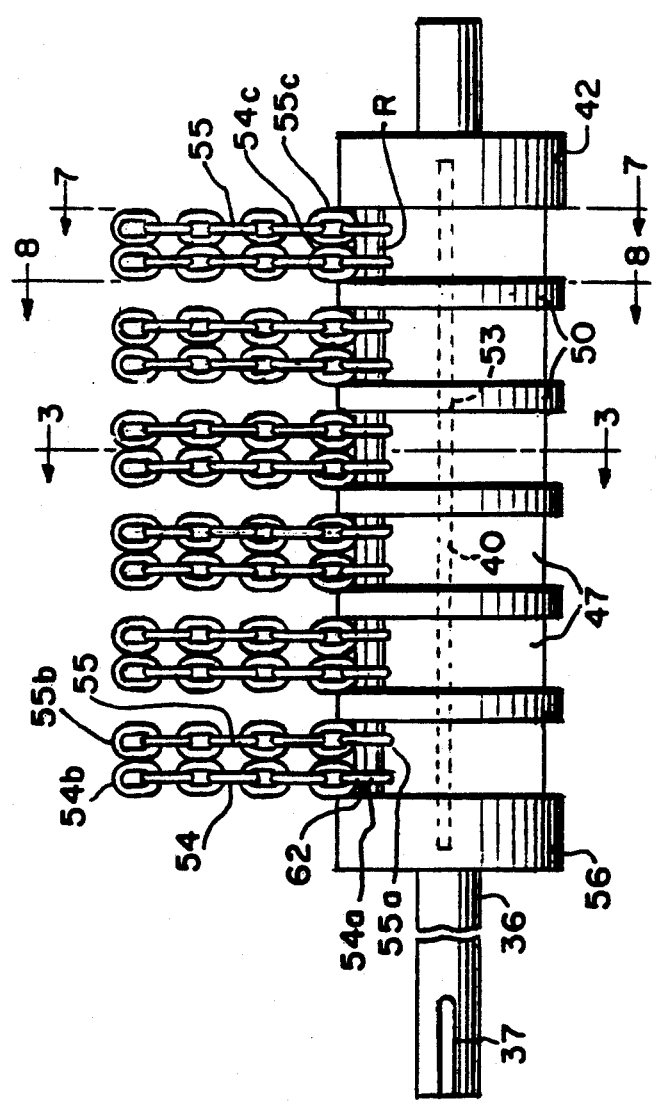

FLAIL DRUM SYSTEM

FIELD OF THE INVENTION

The present invention relates to flail drum systems for delimbing and/or debarking wood products comprising trees and logs.

BACKGROUND OF THE INVENTION

Particularly for producing chips from logs and small trees which are used in the paper industry to make pulp, it is desirable to remove any limbs and the bark prior to introducing the tree or log to a chipper for chipping the wood product into usable chips. Flail drum systems of the character to be disclosed have been used in conjunction with chippers and like processing machinery for many years, and have been proposed and used in many forms. For example, the following prior art U.S. Pat. Nos., which are incorporated herein by reference, are concerned with various flail assemblies and their use:

1,552,498, Noyes
4,023,604, Stadnick
4,061,166, Larson
4,172,481, Brisson
4,222,418, McCray et al
4,572,258, Mischel
4,787,431, Demlow
4,889,169, Peterson et al
4,947,906, Schroeder The present invention is directed to a system of improved character which will operate in the field for much longer periods of time before part replacement is necessary, provides increased bark removing capability, and enables the more economic replacement of the component parts which are subject to wear.

SUMMARY OF THE INVENTION

The present flail system incorporates bark and limb removing flails such as chains, to forcibly remove small limbs or limb stubs, and the bark, from the core portion of the tree or log, as the wood products are fed continuously through a bark and limb flailing station. Typically, the station may be part of a mobile machine which also mounts a chipper to which the wood products are then fed, or the flailing station may itself constitute a separate mobile unit which is movable up to a position adjacent such a chipper.

The present invention is concerned with a flail drum having a central shaft connected with a drive mechanism for rotating the shaft. Removable end support members are fixed to the shaft and have circumferentially spaced removable rods which extend between them. A series of rod support rings have circumferentially spaced openings, through which the rods extend and circumferentially scalloped spacers are provided between the rings and have radially inwardly extending enlarged recesses through which the rods extend without engaging the spacers. The radially extending, circumferentially spaced chains are connected at their inner terminal ends to the rods and have their end links received in the recesses in the spacers. As the drum rotates, the outer terminal ends freely contact the forwardly moving wood products to flail and remove the bark and limbs. The system contemplates the employment of a pair of axially side by side chains on the rods, between each of the rings, with the rings projecting circumferentially beyond the spacers to protect the chains.

One of the prime objects of the present invention is to provide a longer operable system of the character described which is so constructed that wear parts can be more readily disassembled, new parts substituted, and operation quickly resumed.

Another object of the invention is to provide a system wherein the parts to be replaced for wear are relatively simple and compact, and economical to manufacture as well as replace.

Still another object of the invention is to provide a system which does not require the welding of elements to the shaft so that no welding stresses are induced in the shaft and high alloy shafts of greater strength can be used.

Another object of the invention is to provide a flail system of the character described which has visible component parts and is easy to inspect for wear, and wherein there is ready access to the chains and a wider variation of chain lengths, pitches, and diameters is possible Still a further object of the invention is to provide a system in which plural, side by side, chain flails are used which cooperate to mutually support one another and increase chain life, while covering a larger surface area of the wood product.

Another object of the invention is to provide a flail system of the character described wherein available chain area is increased by plural side by side chains which are used between rod support rings and function more efficiently to remove the bark and limbs.

Still another object of the invention is to provide a system involving spacers which are of lesser diameter than rod supporting rings which are used, the system tending to protect the inner links of the chain and the rods by holding the wood product up on the rings where the smooth peripheral surface of the rings provides an easy surface to ride on so that drag on the tree or log is avoided.

Still another object of the invention is to provide a system which permits the use of a larger diameter shaft capable of standing more abuse and punishment and improving the flywheel effect and balance of the flailing drum.

Other objects and advantages of the invention will be pointed out specifically or will become apparent from the following description when it is considered in conjunction with the appended claims and the accompanying drawings.

DESCRIPTION OF THE DRAWINGS

FIG. 2 is a schematic, side elevational view of the drum only, certain parts being omitted in the interest of clarity;

FIG. 3 is a schematic, transverse sectional view taken on the line 3—3 of FIG. 2 in which, however, all of the circumferentially spaced chain pairs are illustrated;

Figure 1:
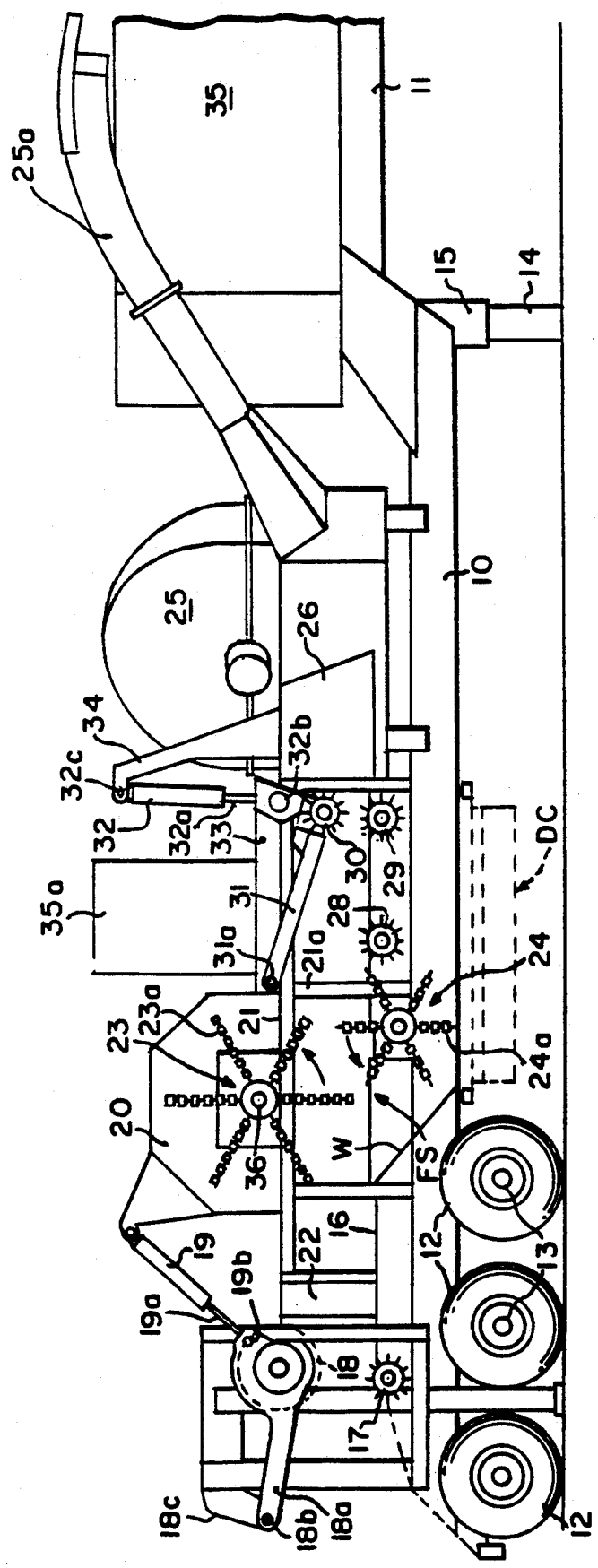
FIG. 1 is a schematic, side elevational view of one machine with which the flail drum system of the present invention may be utilized.

Referring now more particularly to the accompanying drawings, and in the first instance to FIG. 1, I have shown a trailer vehicle including a frame or bed 10 having a forwardly extending tow bar 11 adapted to be connected to a motive vehicle which can pull it along logging trails in the forest. The frame 10 is supported on wheels 12, rotatable on frame supported axles 13, and on a lowerable front stand 14 which is raiseable to a position within a housing 15 when not in use and the trailer is in transit. A floor 16 is provided to support the tree or log as it is moved forwardly into the machine by a hydraulically driven, toothed lower roll 17, and a hydraulically driven upper roll 18 may be provided to further assist the log or tree into the device and hold it in position for flailing. It is to be understood that, typically, a boom with a grapple (not shown) will be utilized to pick up the logs and feed them into the inlet of the machine defined by rolls 17 and 18. The upper roll 18 is supported for vertical swinging travel on an arm 18a pivoted at 18b to a frame supported bracket 18c. A hydraulic cylinder 19, which has its piston rod 19a connected to arm 18a at 19b is pivotally supported on a housing 20 supported by longitudinally extending subframe members 21. The members 21 are supported from the frame 10 on vertical posts 21a.

As FIG. 1 indicates, housing 20 may be provided to house a belt drive mechanism for driving an upper flail drum assembly, generally designated 23, which, with a lower flail drum assembly, generally designated 24, and supported on the open frame 10, constitutes a debarking and delimbing flail drum system disposed at what may be termed a flailing station FS. It is to be understood that the flail drum assemblies 23 and 24 are identical except that the chain systems 23a of system 23 may be longer, i.e., typically twenty-four inches, than the chain systems 24a of flail drum assembly 24, which typically may be fifteen inches in length. The assembly 24 is located slightly upstream from the assembly 23 and is driven in a counter direction to the flail drum assembly 23, as indicated by the counter-rotating arrows in FIG. 1. Material removed by the flail units 23 and 24 can fall to a paddle type endless debris conveyor DC, extending transversely to the machine, with inclined wall W assisting its passage.

Upstream of flail drum assembly 24, is a conventional angularly disposed chipper unit, generally designated 25, having an inlet chute 26 to receive the debarked and delimbed wood products, and an outlet duct 25a to direct chips to a chip van or the like (not shown). Toothed rolls 28 and 29 are provided at the level of the bottom of chute 26, and an upper toothed roller 30 is also provided t assist the feed of the wood products into chute 26. The toothed roller 30, which is mounted on an arm 31 pivoted to the frame as at 31a, may be raised and lowered by the piston rod 32a of a hydraulic cylinder 32 which connects to arm 31 at 32b. Cylinder 32 is pivotally mounted at 32c on a frame supported bracket 34.

All of the rollers 17, 18, 22, 28, 29 and 30 are driven by a conventional rotary hydraulic motor or motors in a direction to advance the trees or logs through the flail station FS. The chipper disc within chipper unit 25 preferably is separately powered and the belt drive mechanism driving flails 23 and 24 are not driven at any speed correlated to the chipper disc. For instance, one engine 35 powers the knived chipper disc and separate engine 35a powers the flail assemblies 23 and 24.

Referring now more particularly to the flail units 23 and 24, attention is directed to the remaining figures of the drawing wherein their construction is described in more detail. Because the flail units are identical, except for the length of the flail chain systems, 23a and 24a, a description of the flail chain assembly 24 will suffice as a disclosure of both.

The assembly 23 includes a central shaft 36 (FIG. 2) having a drive key slot 37 for a keyed drive sheave which is driven by belt drive mechanism operated by a diesel or other engine. As FIG. 2 particularly indicates, the shaft 36 is threaded at spaced intervals as at 38 and 39 and a second longitudinally extending keyway 40 is provided in the shaft 36 to receive a key 41.

Figure 5:
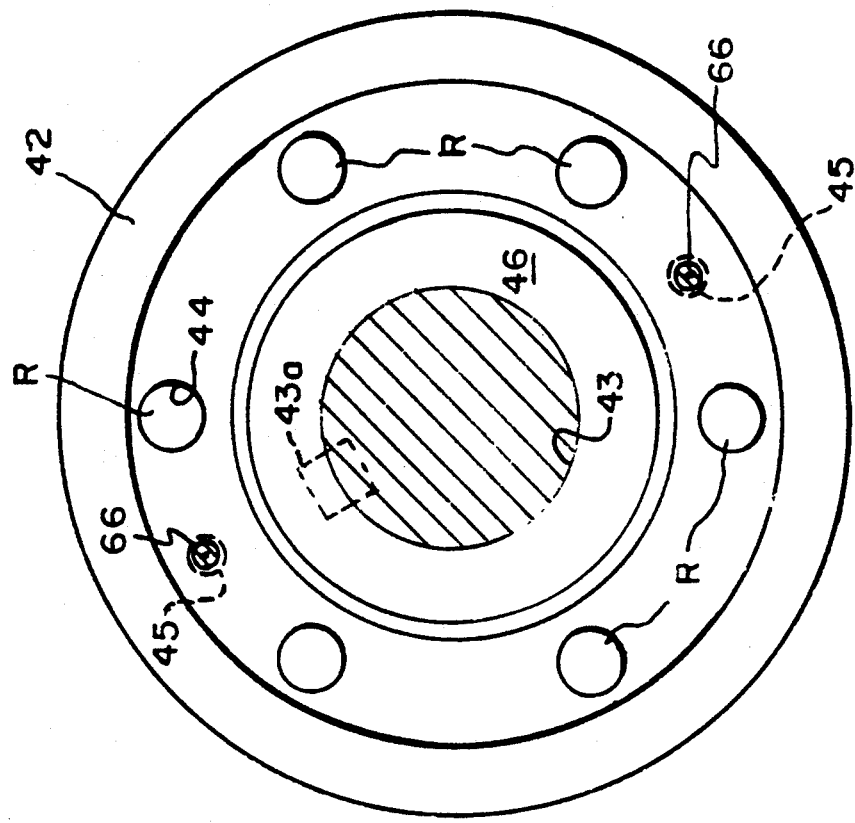
FIG. 5 is a cross-sectional view taken on the line 5—5 of FIG. 4.
Figure 7:
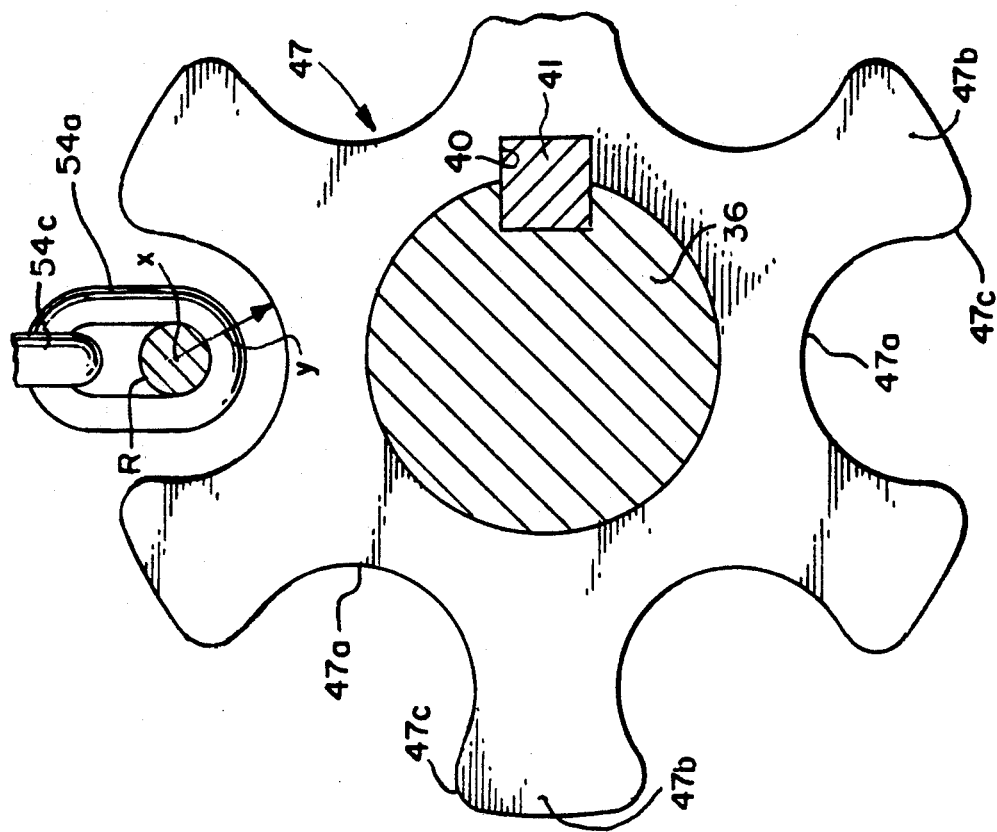
FIG. 7 is a fragmentary, transverse sectional view on an enlarged scale, taken on the line 7—7 of FIG. 2, with certain parts again omitted in the interests of clarity.
Figure 8:
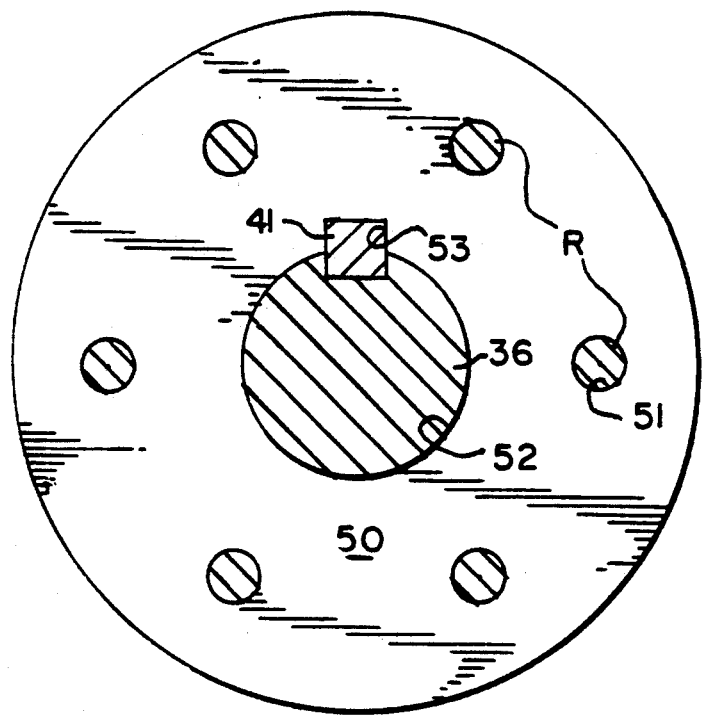
FIG. 8 is an enlarged fragmentary transverse sectional view taken on the line 8—8 of FIG. 2, with parts again omitted in the interest of clarity.

At one end of shaft 36, rod end support member 42, having a central opening 43 is provided with a key slot 43a so that it can be slipped over the shaft 36. The end disc or member 42 is provided with a series of equally circumferentially spaced, rod- receiving openings 44 (FIG. 5) to receive longitudinally extending rods R, and is further provided with threaded bores 45 (FIG. 5) for a purpose to be later described. A positioning nut 46, threaded on the shaft thread 38, bears against the recessed shouldered wall 42a. Scalloped annular spacers, generally designated 47 (see FIG. 7), having shaft accommodating openings 48 with keyways 49, and rod receiving support rings 50 (FIGS. 2 and 8), are also assembled in alternating relation on the shaft 36. The rings 50 have circumferentially spaced, rod-receiving openings 51 in exactly the spaced relation of the openings 44 in end member 42, and also have a central shaft accommodating opening 52 provided with a keyway 53. It is to be noted that the spacers 47 have radially extending recesses or openings 47a spaced circumferentially so that the axes "x" of openings 47a are in axial alignment with the openings 44 and 51. Thus, the elongate axially parallel rods R, when received in the openings 44 and 51, extend centrally through the spacer recesses 47a in the manner indicated in FIG. 7 on axes "x" for the radii "y" on which the inner curved ends of recesses 47 are generated. As FIG. 7 indicates, there may be six such recesses 47a and, between the recesses 47a, are toothlike protrusions 47b which have enlarged rounded ends 47c curving oppositely to the curvature of recesses 47a.

Figure 9:
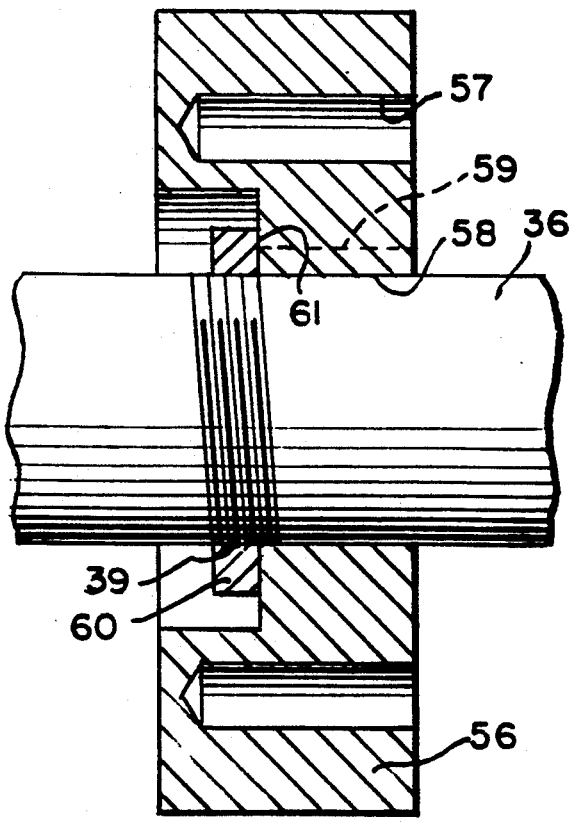
FIG. 9 is an enlarged, fragmentary, side elevational view illustrating the opposite and support member, parts again being omitted in the interest of clarity.

Provided on each of the rods R to extend radially outwardly from the rods, are the chain systems 23a and 24a, which each comprise a pair of common link chains 54 and 55. These have, respectively inner links 54a and 55a, and outer links 54b and 55b. The links of the chains 54 and 55, as shown, have successive links disposed at right angles one to the other and, as FIG. 2 indicates, the alternating links, beginning with the second links 54c and 55c are sidewisely adjacent one another. Provided on the opposite end of the shaft 36 from end member 42, is an end member 56 (FIG. 9) which has circumferentially disposed blind bores 57 for receiving the ends of rods R. Centrally, the member 56 has a shaft accommodating opening 58 provided with a keyway 59 for receiving key 41. A nut 60 can be threaded on the threaded portion 39 of the shaft 36 until it comes into engagement with the recessed shoulder portion 61 of end member 56.

Because the spacers 47 are smaller in maximum diameter than the end members 42 and 56, and the rings 50, radially inwardly extending annular pockets 62 (FIG. 2) are provided adjoining the recesses 47a between the ring members 50, and between the end ring members 50 and the end members 42 and 56 at each end of the assembly. As FIG. 2 illustrates, the links 54c and 55c, when in side by side alignment, are a relatively close fit in the pockets 62 and so the edges of links 54c and 55c tend to be guided by one another and by the radial walls of the rings 50, and the inner radial walls of the members 42 and 56. With the pairs of chains in this position of adjacency, they tend to mutually support one another and maintain their side by side alignment (although some turning on rods R can occur) and there is less wear than is encountered when chains are employed singly, because there is less deflection over the full lengths of the chains on rebound.

The assembly disclosed provides better chain control and enables the use of pairs of mutually reinforcing chains in pairs, without the necessity of staggering the pairs circumferentially. It has been found that the greatest chain wear occurs in the first links 54a and 55a, and in the outer three links of the chains. Worn chains from the assembly 23 which are required to be, for example, 13 links in length, can after that wear, be reduced in length and used as the 8 links in the assembly 24. A further advantage of providing pockets 62 is to keep any part of the wood product engaged with the peripheries of members 42, 50 and 56, which are smooth surfaced, and away from the scalloped circumferential surface of the spacers 47.

Figure 4:
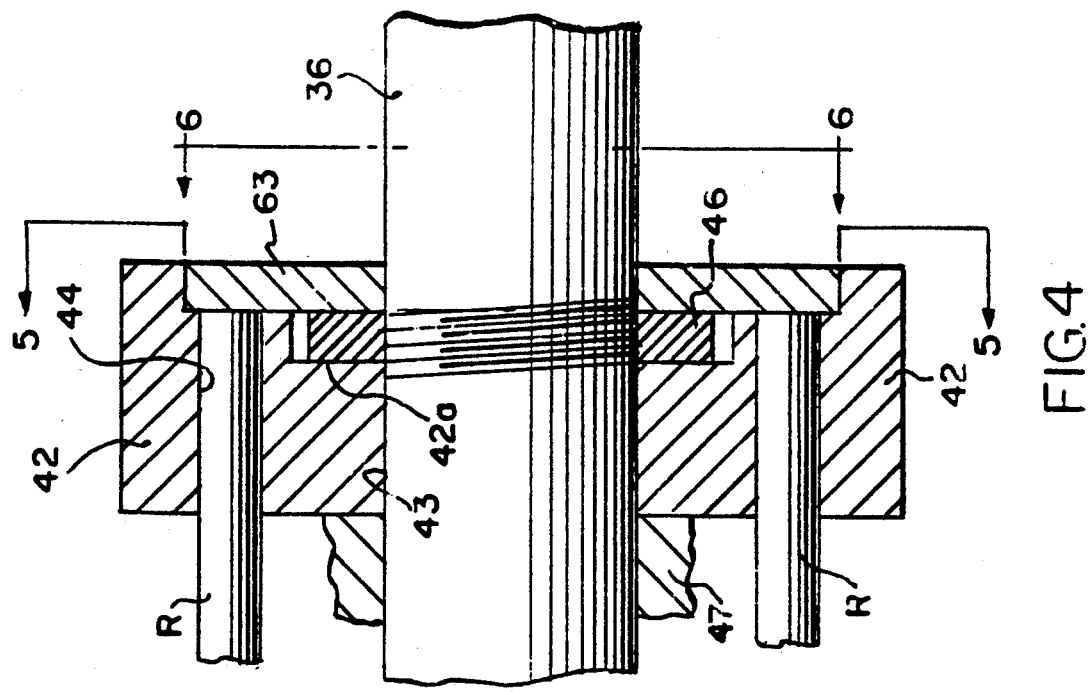
FIG. 4 is an enlarged, fragmentary, side elevational sectional view, more particularly illustrating one of the end support members and the manner in which the chain support rods are received therein, parts being omitted in the interest of clarity.
Figure 6:
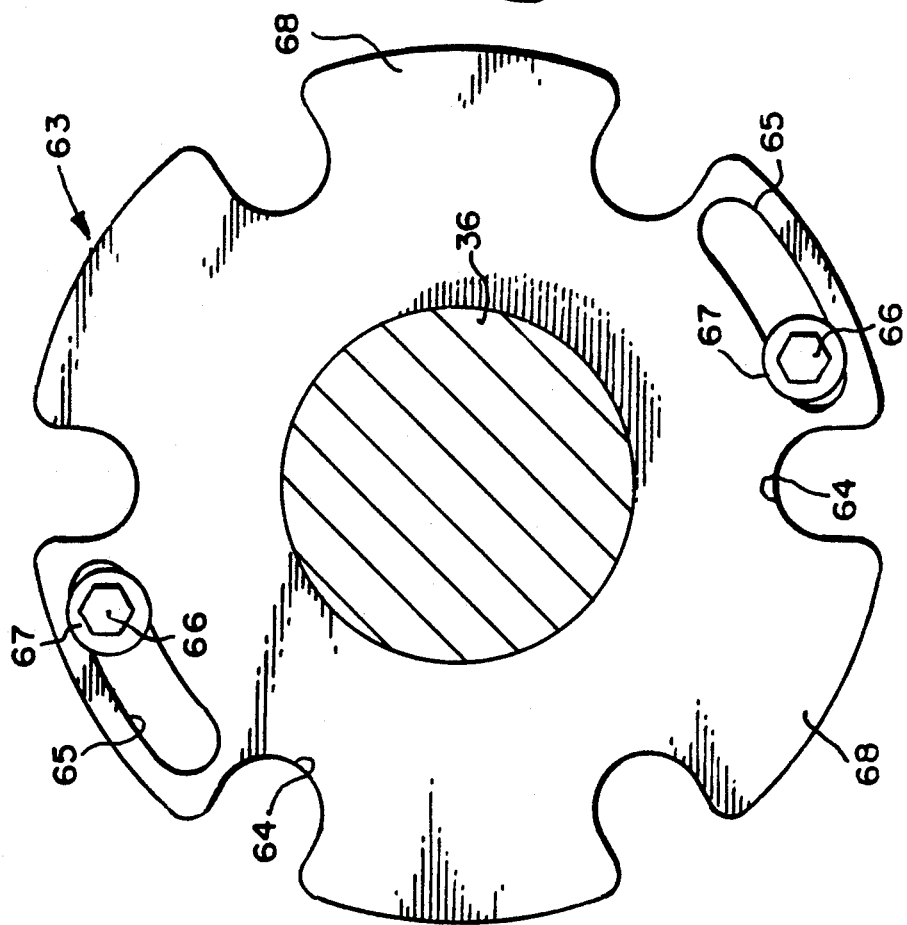
FIG. 6 is a cross-sectional view taken on the line 6—6 of FIG. 4.

As FIGS. 4 and 6 particularly illustrate, a locking plate 63, which is rotatable on shaft 36, is used to selectively close off the openings or passages 44 in end member 42. The plate 63 has spaced recesses 64 which circumferentially align with the openings 44 in one rotary position of plate 63 and permit the rods R to be simply pulled outwardly for replacement of any of the chains 54 and 55. The plate 63 also has a pair of slots 65 aligning with the threaded openings 45 in the end member 42 so that bolts 66 with enlarged washers 67, can thread into the openings 45. When the plate 6 is rotated slightly the ends of rods R are covered by the protrusions 6B between recesses 64, the slots 65 being of somewhat less width than the diameter of the rods R in those protrusions 68 which have the slots 65. In its rod blocking position, plate 63 is secured by bolts 66 to rotate with end member 42.

THE OPERATION

Small trees and logs are fed endwisely between the feed roll members 17 and 18 at the rear of the machine in FIG. 1 and travel inwardly between the lengths of the chain systems 23a and 24a of the respective flail assemblies 23 and 24. The flail assembly chain systems 23a tends to push the tree or log endwisely inwardly, but it is prevented from being hurled forwardly at an undue rate of speed by the chain systems 24a which operate in a counterclockwise direction in FIG. 1 to tend to brake the product passing between the assemblies 23 and 24. As a small tree, for example, proceeds in the path to flail station FS, the flail chain systems 23a and 24a, revolving at a rapid rate of speed, typically in the neighborhood of 500 or 550 revolutions per minute, flail off limbs, and also effectively flail away the bark to leave a core free of bark. Since the flail drums are longer than the trees or logs are wide, the sides as well as the top and bottom surfaces of the wood product are fully engaged by the chains. The debarked core then can move into the chipper chute 26 and be reduced to small chips in the chipper 25 from whence the chips are ejected in an air stream out chipper outlet opening 25a. Loose bark, limbs and limb fragments, and any fragments of chain, can simply fall by gravity to the transversely extending debris conveyor DC provided to convey material to the sides of the unit.

Whereas, previously, flail drums of a different design have lasted sometimes as little as 30 days, it is expected that the present flail drum assembly will last many times that. All of the component parts shown in FIG. 2 are readily replaceable, either individually or even in large part collectively, when replacement is required, and within a relatively short period of time so that the machine need not be down for any substantial period of time. The replacement of chains is simply accomplished by backing off the bolts 67, slightly revolving the end locking plate 63 to access the rods R and removing the particular rod or rods R involved. Because each operator will maintain an inventory of all of these compact relatively small parts, other worn parts can, also, be easily replaced and the device very readily reassembled and locked in operative position once again.

It is to be understood that the embodiments described are exemplary of various forms of the invention only and that the invention is defined in the appended claims which contemplate various modifications within the spirit and scope of the invention.

What is claimed is:

1. In a flail drum system for delimbing and/or debarking wood products comprising trees and logs and wherein there is a wood product advancing mechanism for moving the wood products forwardly in a generally horizontal path; an upper rotary chain flail drum disposed above the path; and mounted to rotate about a generally horizontal axis transverse to the path; a lower rotary chain flail drum disposed below the path adjacent to the upper drum and mounted to rotate about a generally horizontal axis transverse to the path; and drive mechanism for driving the advancing mechanism and for rotating said flail drums; the improvement wherein at least one of said flail drums comprises:
   a. a central shaft connected to be driven by said drive mechanism;
   b. a pair of axially spaced apart end rod support members fixedly mounted on said shaft and having circumferentially aligned and spaced removable rods extending between them;
   c. a series of radially extending rod support rings, having side walls with circumferentially spaced openings through which said rods extend, and which support said rods, fixedly connected to rotate with said shaft;
   d. circumferentially scalloped annular spacers, disposed between said rings and circumferentially inset with respect to said rings to form circumferentially inset pockets between said rings with pocket side walls defined by said ring side walls, and providing radially inwardly extending openings through which said rods extend without engaging said spacers;
   e. radially extending, circumferentially spaced chains, comprising a series of connected loop links with radially inner and outer terminal ends, the inner terminal ends of the chains comprising chain links, through which said rods extend, received in the openings in said spacers, and chain links extending outwardly therefrom which are guided on said pocket side walls radially outwardly of said spacers during rotation of the shaft, the outer terminal ends of said chains extending sufficiently beyond said rings to freely contact wood product moving in said path during rotation of said shaft;

f. and means for fixedly connecting said spacers so that said openings therein, through which said rods extend, remain aligned with the openings in said rings through which said rods extend.

2. The system of claim 1 wherein said flail drums are counterrotated.

3. The system of claim 1 wherein said shaft is threaded at spaced apart intervals to coincide with the positions of said end rod support members, and nuts threaded on said shaft and cooperative with said end rod support members axially maintain said end rod support members on said shaft.

4. The system of claim 1 wherein said end rod support members, said spacers, and said rings are commonly keyed to said shaft.

5. The system of claim 1 wherein one of said end rod support member has rod receiving openings extending axially through it, a locking plate is rotatably mounted on said shaft adjacent said one end rod support member and has openings which align with said rod receiving openings provided between radial projections, said locking plate being rotatable from a position in which said openings in the locking plate align with said rod receiving openings in said one end rod support member to a position in which said radial projections align with them, and means for locking said locking plate in position.

6. The system of claim 1 wherein pairs of radially extending side by side chains, with alternate pairs of side by side chain links, are provided on said rods in each of said inwardly extending openings in said spacers.

7. The system of claim 6 wherein said spacers are radially inset from said rings to provide chain pockets between said rings of an axial width substantially the same as the axial width of the pairs of side by side chain links so that said rings tend to guide the radially inner ends of said chains and the chains tend to mutually reinforce one another in their flailing action.

8. A flail drum for a flail drum system operable for delimbing and/or debarking wood products, comprising trees and logs, at a flailing station wherein there is forwarding mechanism for moving the wood products forwardly in a generally horizontal path, a rotary chain flail drum disposed adjacent to the path and mounted to rotate about an axis transverse to the path, an opposite rotary chain flail drum disposed adjacent the path and mounted to rotate about an axis transverse to the path, and drive mechanism for driving the forwarding mechanism to move wood product in said path past said flail drums and for rotating said flail drums; said drum comprising:

a. a central shaft connected to be driven by said drive mechanism;

b. circumferentially spaced, generally axially extending rods radially spaced from said shaft and supported thereon for rotation therewith;

c. a series of rod support rings having circumferentially spaced openings through which said rods extend, and which support said rods, fixedly connected to rotate with said shaft;

d. circumferentially scalloped spacers between said rings, having ends adjacent said rings and connected to rotate with said shaft, and providing radially inwardly extending openings, with unbroken marginal radial walls extending from one end of the spacer to the other through which said rods extend without engaging said spacers; and e. a plurality of side of side, axially in-line mutually reinforcing, radially extending, adjacent chains for each spacer comprising a series of connected loop links with radially inner and outer terminal ends, the inner terminal ends of the chains comprising closed links in said spacer openings through which said rods extend, and the outer terminal ends of the chains extending sufficiently beyond said rings with rotation of said shaft to freely contact wood product moving in said path.

9. The assembly of claim 8 wherein said spacers are circumferentially inset from said rod support rings.

10. The assembly of claim 8 wherein said spacers and rings are commonly keyed to said shaft.

11. The assembly of claim 8 wherein at least one end rod support member is provided adjacent the endmost of said spacers and has openings circumferentially spaced to receive the ends of said rods.

12. The system of claim 11 wherein said end rod support member has rod receiving openings extending axially through it, a locking plate is rotatably mounted on said shaft and has openings, which align with said rod receiving openings, provided between radial stop projections, said plate being rotatable from a position in which said openings in the locking plate align with said rod receiving openings in said end rod support member to a position in which said radial projections align with them and block said rods, and means for locking said locking plate in blocking position.

13. The system of claim 8 wherein pairs of side by side chains have radially inner links received on said rods in each of said inwardly extending openings in said spacers.

14. The system of claim 13 wherein said side by side chains have side by side links adjacent to said inner links, said spacers are radially inset from said rings to provide chain pockets between said rings of an axial width substantially the same as the axial width of the pair of side by side chain links so that said rings not only tend to guide the radially inner ends of said chains but the chains tend to mutually reinforce one another in their flailing action.

15. The assembly of claim 8 wherein said spacer openings are configured to provide radially extending tooth-like projections between them, and said projections at their outer ends are circumferentially enlarged and have curvilinear surfaces forming the necks of said spacer openings.

16. A method of removing flail supporting rods from a flail drum operable for delimbing and/or debarking wood products, comprising trees and logs, at a flailing station wherein forwarding mechanism moves the wood products forwardly in a path past a rotary chain flail drum disposed adjacent to the path and mounted to rotate about an axis transverse to the path, the flail drum having a central shaft, axially parallel, circumferentially spaced generally axially parallel rods radially spaced from the shaft and supported thereon for rotation therewith, a series of rod support rings having circumferentially spaced openings through which the rods extend connected to rotate with the shaft, circumferentially scalloped spacers between the rings connected to rotate with the shaft and providing radially inwardly extending openings through which the rods extend without engaging the spacers, and radially extending, circumferentially spaced chains comprising a series of connected loop links with radially inner and outer terminal ends, the inner terminal ends of the chains comprising closed links through which the rods freely extend, and the outer terminal ends of the chains extending sufficiently beyond the rings to freely contact wood product moving in the path, end members on said shaft, one of said end members having circumferentially spaced through passages in which the ends of said rods are received, and a lock plate rotatable on said shaft relative to said end member from a position covering said passages to a position in which it does not; and locking mechanism for said lock plate to lock it in position, the steps of:

a. unlocking said lock plate;
b. revolving it from a position in which it blocks the openings in said end member to a position in which it does not;
c. withdrawing at least one of the rods endwisely from the drain links and drum to free chains formerly supported thereon;
d. reinserting said rod through the inner closed links of chains held in the spacer openings; and
e. rotating said locking plate to block the rod ends in said end member passages and locking it in position to rotate with the end member.

17. A flail drum for a flail drum system operable for delimbing and/or debarking wood products, comprising trees and logs, at a flailing station wherein there is forwarding mechanism for moving the wood products forwardly in a generally horizontal path, a rotary chain flail drum disposed adjacent to the path and mounted to rotate about an axis transverse to the path, an opposite rotary chain flail drum disposed adjacent the path and mounted to rotate about an axis transverse to the path, and drive mechanism for driving the forwarding mechanism to move wood product in said path past said flail drums and for rotating said flail drums; said drum comprising:

a. a central shaft connected to be driven by said drive mechanism;
b. circumferentially spaced generally axially extending rods radially spaced from said shaft and supported thereon for rotation therewith;
c. a series of rod support rings having circumferentially spaced openings through which said rods extend, and which support said rods, fixedly connected to rotate with said shaft;
d. circumferentially scalloped spacers between said rings connected to rotate with said shaft and providing radially inwardly extending openings through which said rods extend without engaging said spacers;
e. radially extending, circumferentially spaced chains comprising a series of connected loop links with radially inner and outer terminal ends, the inner terminal ends of the chains comprising links through which said rods extend, and the outer terminal ends of the chains extending sufficiently beyond said rings with rotation of said shaft to freely contact wood product moving in said path;
f. at least one end disc member provided at the end of said drum which has through openings circumferentially spaced to receive the ends of said rods; and
g. a locking plate rotatably mounted on said shaft and having through openings which align with said rod receiving openings, provided between radial stop projections, said plate being rotatable from a position in which said openings in the locking plate align with said rod receiving openings in said end support member and can be withdrawn to a position in which said radial projections align with the openings in said end support member and block said rods; and
h. releasable means for holding said locking plate in blocking position.

18. A flail drum for a flail drum system operable for delimbing and/or debarking wood products, comprising trees and logs, at a flailing station wherein there is forwarding mechanism for moving the wood products forwardly in a generally horizontal path, a rotary chain flail drum disposed adjacent to the path and mounted to rotate about an axis transverse to the path, an opposite rotary chain flail drum disposed adjacent the path and mounted to rotate about an axis transverse to the path, and drive mechanism for driving the forwarding mechanism to move wood product in said path past said flail drums and for rotating said flail drums; said drum comprising:

a. a central shaft connected to be driven by said drive mechanism;
b. circumferentially spaced, generally axially extending rods radially spaced from said shaft and supported thereon for rotation therewith;
c. a series of radially extending rod support rings, having side walls with circumferentially spaced openings through which said rods extend, and which support said rods, fixedly connected to rotate with said shaft;
d. circumferentially scalloped spacers, disposed between said rings and circumferentially inset with respect to said rings to form circumferentially inset pockets between said rings with pocket side walls defined by said ring side walls, connected to rotate with said shaft and providing radially inwardly extending openings through which said rods extend without engaging said spacers; and
e. radially extending, circumferentially spaced chains comprising a series of connected loop links with radially inner and outer terminal ends, the inner terminal ends of the chains comprising chain links, through which said rods extend, and chain links connected thereto and extending outwardly therefrom which are guided on said pocket side walls radially outwardly of said spacers during rotation of the shaft, and the outer terminal ends of the chains extending sufficiently beyond said rings with rotation of said shaft to freely contact wood product moving in said path during rotation of said shaft.

* * * * *

UNITED STATES PATENT AND TRADEMARK OFFICE
CERTIFICATE OF CORRECTION

PATENT NO. : 5,148,844
DATED : September 22, 1992
INVENTOR(S) : Milan W. Robison It is certified that error appears in the above-identified patent and that said Letters Patent is hereby corrected as shown below:

Column 3, line 63, change "t" to -- to --.

Column 5, line 46, change "6" to -- 63 --; line 47, change "6B" to -- 68 --.

Signed and Sealed this

Fifth Day of October, 1993

Attest:

BRUCE LEHMAN

Attesting Officer     Commissioner of Patents and Trademarks